F. L. DARLING.
WHEEL RIM.
APPLICATION FILED DEC. 18, 1916.

1,280,176.

Patented Oct. 1, 1918.
3 SHEETS—SHEET 1.

INVENTOR
Frank L. Darling.
BY
Fred G. Dieterich & Co.
ATTORNEYS

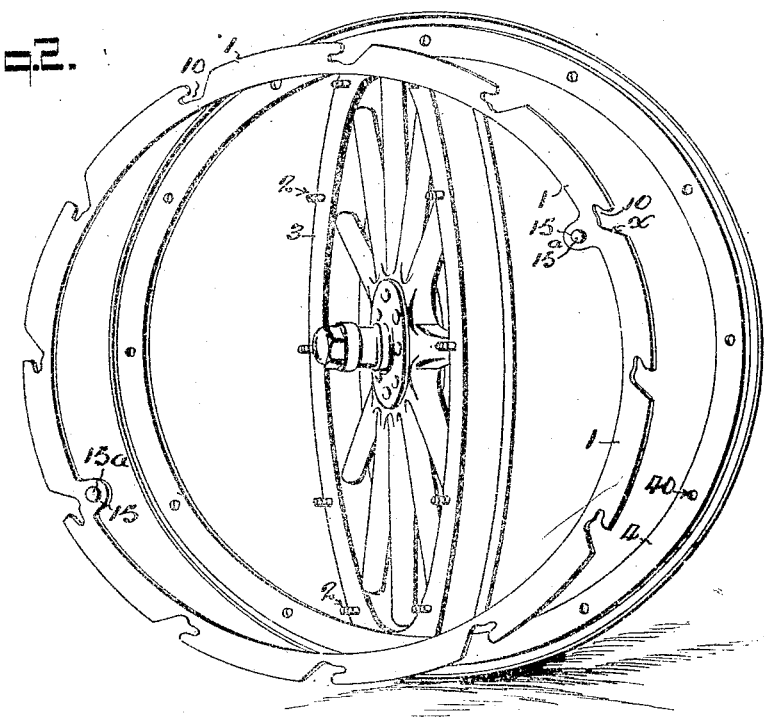

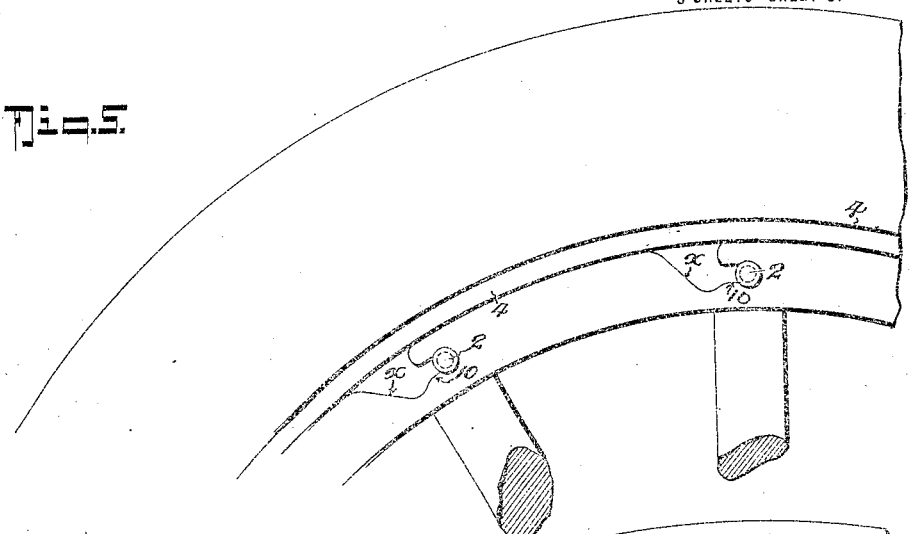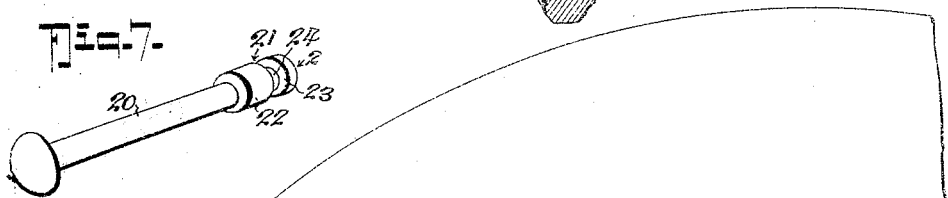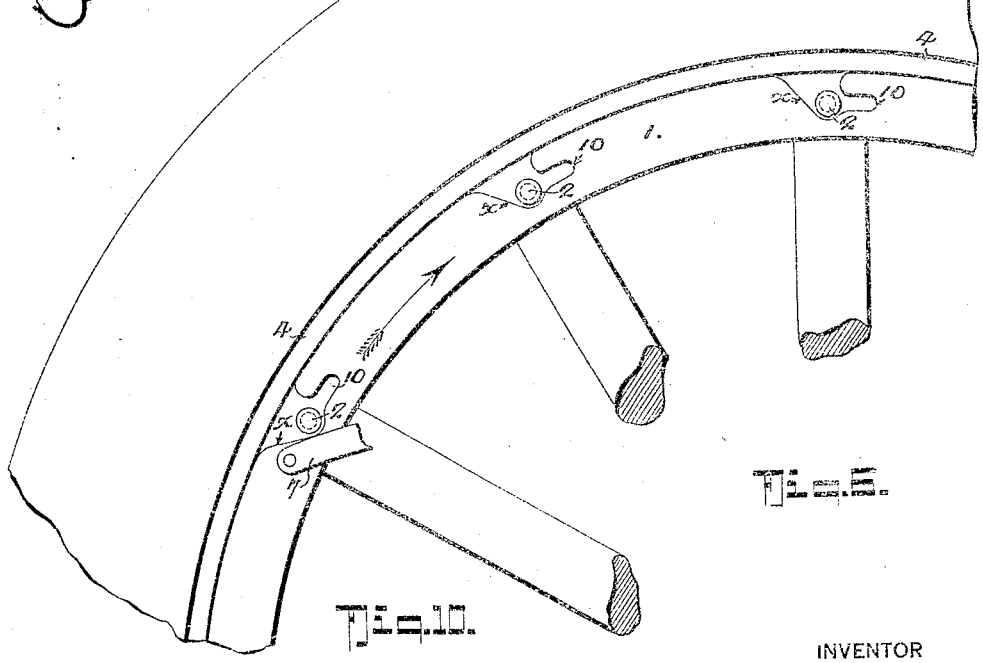

UNITED STATES PATENT OFFICE.

FRANK LEE DARLING, OF LONG BEACH, CALIFORNIA.

WHEEL-RIM.

1,280,176.  Specification of Letters Patent.  Patented Oct. 1, 1918.

Application filed December 18, 1916. Serial No. 137,673.

*To all whom it may concern:*

Be it known that I, FRANK LEE DARLING, residing at Long Beach, in the county of Los Angeles and State of California, have invented a new and Improved Wheel-Rim, of which the following is a specification.

My invention, which has reference to improvements that are especially designed for holding pneumatic tires on their rims and for conveniently removing them from the rim, primarily has for its object to provide an improved means of the character stated, which, when applied, positively holds the tire on the rim and which is adapted for such adjustments whereby a quick and easy removal of the tire, in its punctured or inflated condition, from the wheel, is provided for.

The usual method of removing tires, in other types of rim structures for automobile wheels, is to crowd the tire over the edge of the rim in taking the same on and off. This method requires a lot of exertion and is an operation almost impossible for women to accomplish, even with the present types of demountable rims now in use, since in the latter, there are a lot of threaded bolts and nuts to adjust that requires time and exertion, and even after the demountable rim is removed from the wheel, it still requires considerable labor to remove the tire from the rim, which must be done, to repair the inner tube.

Among other objects, my invention is especially designed for doing away with the usual trouble and time required for removing the tire from the wheel, and at the same time materially add to the life of the tire by reason of removing the danger of damaging the tire and the tube, incident in the use of tire irons commonly required to remove the tire from the rim.

Another object of my invention is to provide, in a tire rim structure, a means for locking the rim parts to their tire securing position, so constructed that the operation of unlocking the rim parts, for removing the tire, are not hindered by mud or other foreign matter that may clog on the wheel rim.

Again, my invention seeks to provide an improved vehicle rim construction of the general character stated that can be run without a tire thereon without damaging the rim, as is incident in the usual type of quick detachable tire holding rim structures.

With other objects in view that will hereinafter appear, my invention embodies the peculiar features of construction and combination of parts fully set out in the appended description and claims and illustrated in detail in the accompanying drawings, in which:

Fig. 3 is a cross section of the rim with the tire thereon and my improvements applied, a clencher type of rim being shown.

Fig. 4 is a similar view showing a straight side rim.

Fig. 5 is a side elevation of a portion of the wheel, the locking ring being at the locked position.

Fig. 6 is a similar view that shows the said locking ring at the unlocked position.

Fig. 7 is a detail view of one of the locking lugs or pins.

Fig. 8 is a cross section of the rim with the tire thereon and illustrates the manner of applying the removable clencher (or straight) rim member.

Fig. 9 is a detail view of a portion of the locking ring, and

Fig. 10 is a detail view that illustrates the detent for holding the locking ring to its locked position.

Fig. 11 is a detail view of modified form of key hole slot in the locking ring.

Figure 1:
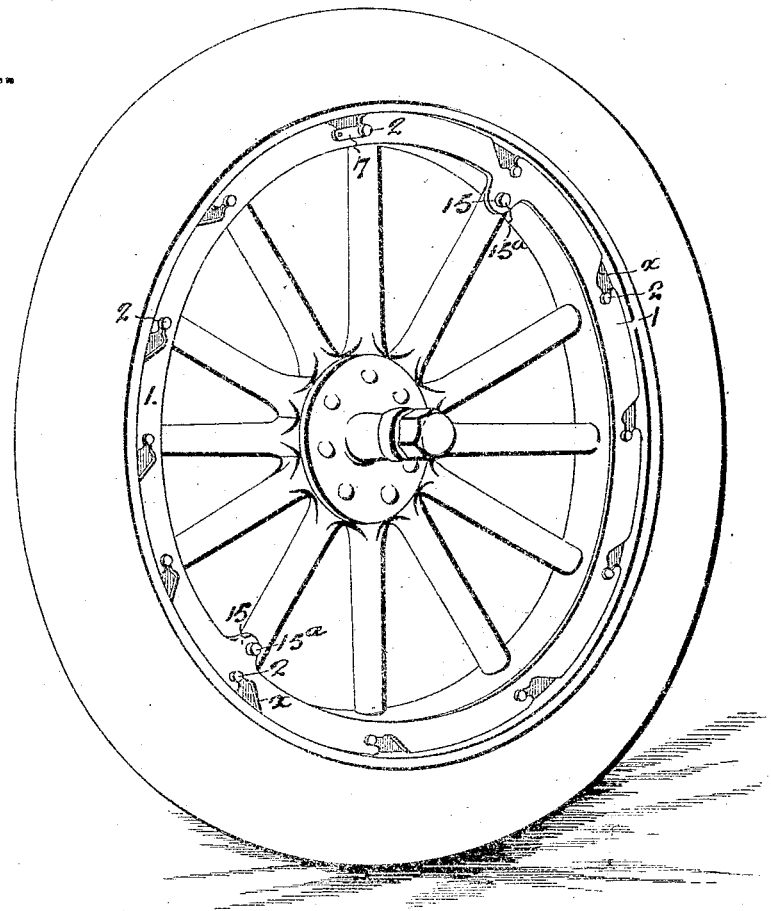
Figure 1 is a perspective view of a motor vehicle wheel, with my improvements applied.
Figure 1:
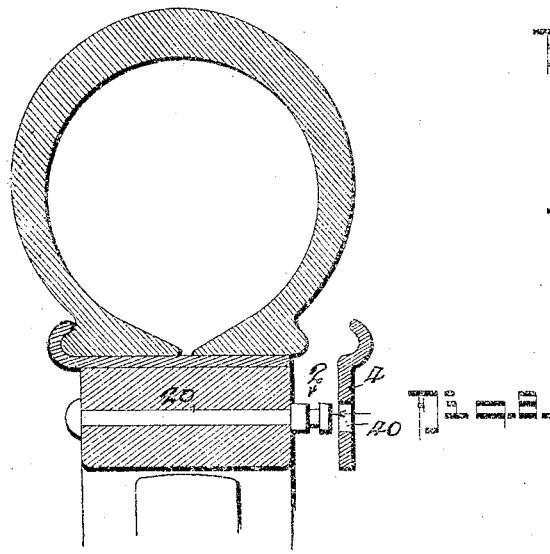
Figure 1:
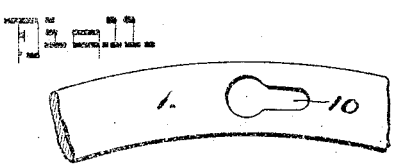

Essentially, my invention consists in an improved form of locking element for holding the clencher or straight side rim member interlocked with the wheel felly and the tire, and the said element is in the nature of a flat ring 1 that is formed with a series of key hole slots 10 for coöperating with a corresponding series of stud key bolts 20 that project laterally from that side of the wheel felly 3 onto which the usual straight or clencher shaped clamping rim member is applied.

By referring to Figs. 3, 4 and 8, it will be noticed that the key studs 2 are in the nature of bolts 20 that pass through the wheel felly 3 and which at their projecting ends have an annularly enlarged portion provided with an annular groove 21 that divides the said enlarged portion into inner and outer lugs 22—23, of like diameter, the inner ones of which fit in the corresponding series of apertures 40 in the removable straight or clencher rim section 4, it being understood that the inner lug 22 is made of the same diameter as that of the outer lug 23, since the apertures 40, in the rim section 4 must be large enough to slip the rim section 4 over the outer end of the key bolt 20 when pulling the rim sections together, see Fig. 8.

The locking ring 1 is of a thickness for snugly riding upon the shanks 24 formed by the grooves 21, so that in turning the ring 1 into the desired direction, all of the key hole slots will be simultaneously moved into or out of a locked engagement with the locking studs 2 and to provide for conveniently and freely turning the ring to the locked or unlocked positions, said ring has a pair of diametrically opposite internally projected ears 15—15, each provided with outwardly projected wrench receiving members 15$^a$, it being understood that by providing two wrench receiving members, arranged as shown, the operation of rotating the locking ring is greatly facilitated.

Figure 2:
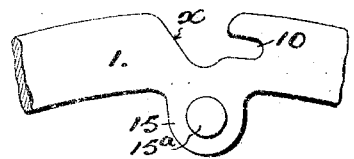
Fig. 2 is a perspective view that illustrates the wheel, the separable rim members and the locking ring, separated.

The key slots in the ring 1 may be formed with closed ends, as in Fig. 11, or open at the hole end, as shown in Figs. 1, 2, 5 and 6, the latter form of slot being preferable, since by having the hole portion of the slot open up through the periphery of the ring, the angle edge $x$ thereof, acts as a cutter as it cuts through or shears off caked mud or other particles that may be on the wheel felly.

The locking keys or lugs, serve a double purpose in holding the detachable straight or clencher rim member from rotating or moving about on the wheel felly and also serve to hold the locking ring in place, thereby holding the said clencher or straight rim member against the wheel and, it should be stated, that since the clencher or straight rim member is of less thickness than the length of the inner stud on which the said rim member is mounted, a sufficient space is left between the said clencher or straight rim member and the wheel face, when the parts are assembled, to permit an easy rotation and removing of the various parts when a puncture occurs and consequent pressure is released from the lugs.

In my construction of rim, when the tire is inflated, the pressure firmly forces the clencher or straight rim member out against the locking ring, which, in turn, is firmly pressed against the outer key studs or lugs 23, which secures all parts in place.

To hold the locking ring from working back out of place while running, an adjustable detent, preferably a snap spring, 7, is pivotally attached to the locking ring with its free end adapted for engaging the adjacent one of the lock studs, see Fig. 10, it being obvious that when it is desired to rotate the locking ring to release the parts, the detent 7 is swung down as indicated in Fig. 6.

From the foregoing description taken in connection with the drawings, the complete construction and the advantages of my invention will be readily understood.

The parts being operatively assembled, the locking ring having the position shown in Fig. 5, to demount the tire, all that is necessary is to swing down the latch or detent and then turn the ring 1 in the direction of arrow on Fig. 6 until the hole parts of the key slots come over the locking studs and, when in that position, the locking ring, can be readily lifted out from the wheel and the tire, inflated or down, can then be quickly slipped laterally off the bearing rim member, which is quickly done, since there is nothing to interfere with its removal.

What I claim is:

1. In combination with a felly and a tire mounted thereon; a tire base engaging rim member fixed on the felly, a second tire base engaging member normally held under tire pressure and spaced from the adjacent side of the felly, means for removably holding the second rim member against rotation with respect to the felly, and a locking ring coöperative with the said holding means.

2. In combination with a felly; a tire base engaging rim member fixed on the felly, a second tire base engaging member, means for removably holding said second member against rotation, a locking ring coöperative with said holding means for retaining the said second rim member against lateral displacement, said ring having a key hole slot engagement with the said retaining means, and a latch device in engagement with the ring and the said holding means for retaining said ring against displacement.

3. In combination with a felly; a tire base engaging rim member fixed on the felly, a second tire base engaging member, means for removably holding said second member against rotation, a locking ring coöperative with said holding means for retaining the said second rim member against lateral displacement, said ring having a key hole slot engagement with the said retaining means, and a spring snap detent mounted on the ring and adapted for engagement with the said holding means for retaining the said ring at its rim holding position.

4. The combination of the wheel felly, a tire base engaging rim member fixedly held on the felly, a second tire base engaging member, means on the felly for holding said second tire engaging member against rotation and from contact with the felly and a locking ring coöperative with the said holding means for retaining the said second tire engaging member against lateral displacement, said holding means including a plurality of circumferentially arranged headed key studs projected laterally from the felly and which pass through corresponding apertures in the said second tire engaging member, the said locking ring having key hole slots for coacting with the key stud and a latch device on the ring for engaging an adjacent key stud to hold the locking ring to the locked position, said keyhole slots opening outwardly at the periphery of the ring and provided with a dirt deflecting shearing edge.

5. As an improvement in rims for motor vehicle wheels, the combination with the wheel felly, a tire base engaging rim member fixed on the felly, a series of circumferentially arranged key studs projected from the face of the felly and a second tire base engaging rim member endwise slidable onto or off the key studs of a locking ring that fits against the said second tire engaging member, the said locking ring having circumferentially arranged key hole slots cooperative with the key stud, the said slots at their hole ends opening through the outer edge of the ring whereby to produce a mud shearing or cutting edge when the ring is turned to release from the key studs.

6. As an improvement in rims for motor vehicle wheels, the combination with the wheel felly, a tire base engaging rim member fixed on the felly, a series of circumferentially arranged key studs projected from the face of the felly and a second tire base engaging rim member endwise slidable onto or off the key studs; of a locking ring that fits against the said second tire engaging member, the said locking ring having circumferentially arranged key hole slots cooperative with the key stud, and a spring snap latch pivotally mounted on the locking ring and adapted for engagement with one of the key studs to hold the ring against rotation.

FRANK LEE DARLING.